(12) United States Patent
Shankar et al.

(10) Patent No.: US 8,904,463 B2
(45) Date of Patent: Dec. 2, 2014

(54) LIVE VIDEO BROADCASTING ON DISTRIBUTED NETWORKS

(75) Inventors: Sumankar Shankar, Chennai, TN (US); Prasanna Ganesan, Menlo Park, CA (US)

(73) Assignee: Vudu, Inc., Santa Clara, CA (US)

( * ) Notice: Subject to any disclaimer, the term of this patent is extended or adjusted under 35 U.S.C. 154(b) by 1610 days.

(21) Appl. No.: 11/831,938

(22) Filed: Jul. 31, 2007

(65) Prior Publication Data

US 2008/0281913 A1   Nov. 13, 2008

Related U.S. Application Data

(63) Continuation-in-part of application No. 11/684,637, filed on Mar. 12, 2007, now Pat. No. 7,810,647, which is a continuation of application No. 11/077,411, filed on Mar. 9, 2005, now Pat. No. 7,191,215.

(51) Int. Cl.
| | |
|---|---|
| *H04N 7/173* | (2011.01) |
| *H04L 29/06* | (2006.01) |
| *H04N 21/222* | (2011.01) |
| *H04L 29/08* | (2006.01) |
| *H04N 21/2187* | (2011.01) |
| *G06F 15/16* | (2006.01) |

(52) U.S. Cl.
CPC ........ *H04L 65/4076* (2013.01); *H04N 7/17354* (2013.01); *H04N 21/222* (2013.01); *H04L 67/108* (2013.01); *H04N 21/2187* (2013.01); *H04L 67/104* (2013.01)
USPC ................. 725/115; 725/90; 725/96; 725/98; 709/204; 709/231

(58) Field of Classification Search
None
See application file for complete search history.

(56) References Cited

U.S. PATENT DOCUMENTS

| 5,132,992 A | 7/1992 | Yurt et al. |
| 5,414,455 A | 5/1995 | Hooper et al. |

(Continued)

FOREIGN PATENT DOCUMENTS

| WO | WO 97/16023 | 5/1997 |
| WO | WO 01/24526 | 4/2001 |
| WO | WO 03/041383 | 5/2003 |

OTHER PUBLICATIONS

60_646080, Specification, Panwar.pdf, 709/231, Jan. 2005.*

(Continued)

*Primary Examiner* — Chris Parry
(74) *Attorney, Agent, or Firm* — David R. Stevens; Stevens Law Group (57) ABSTRACT

The techniques related to providing a live program over the Internet are described. According to one aspect of the techniques, a data stream representing a live program is preprocessed to produce a plurality of substreams, each of the substreams comprising decimated samples of the data stream. The number of substreams is relatively large so that the bandwidth requirement for delivering one of the substreams is relatively low. With a group of seeding boxes receiving the substreams, a group of boxes in services are designated to receive the substreams from the seeding boxes, each of these boxes including the seeding boxes is able to support multiple outbound streams (e.g., greater than 2) so that there are enough data suppliers to service the ordering boxes or colonize more boxes to become the data suppliers. As a result, a live program can be timely serviced by peer boxes, significantly reducing the computation and bandwidth burdens on a server(s).

18 Claims, 8 Drawing Sheets

(56) References Cited

U.S. PATENT DOCUMENTS

| | | | |
|---|---|---|---|
| 5,602,918 A | 2/1997 | Chen et al. | |
| RE35,651 E | 11/1997 | Bradley et al. | |
| 5,694,559 A | 12/1997 | Hobson et al. | |
| 5,701,582 A | 12/1997 | DeBey | |
| 5,721,878 A | 2/1998 | Ottesen et al. | |
| 5,729,280 A | 3/1998 | Inoue et al. | |
| 5,761,417 A | 6/1998 | Henley et al. | |
| 5,765,164 A | 6/1998 | Prasad et al. | |
| 5,802,283 A | 9/1998 | Grady et al. | |
| 5,815,146 A | 9/1998 | Youden et al. | |
| 5,815,662 A | 9/1998 | Ong | |
| 5,826,168 A * | 10/1998 | Inoue et al. | 725/101 |
| 5,831,662 A | 11/1998 | Payton | |
| 5,838,314 A | 11/1998 | Neel et al. | |
| 5,877,812 A | 3/1999 | Krause et al. | |
| 5,884,031 A | 3/1999 | Ice | |
| 5,903,563 A | 5/1999 | Rashid et al. | |
| 5,926,205 A | 7/1999 | Krause et al. | |
| 5,928,331 A | 7/1999 | Bushmitch | |
| 5,933,603 A | 8/1999 | Vahalia et al. | |
| 5,948,070 A | 9/1999 | Fujita | |
| 6,018,359 A | 1/2000 | Kermode et al. | |
| 6,037,983 A | 3/2000 | Au et al. | |
| 6,038,560 A | 3/2000 | Wical | |
| 6,055,314 A | 4/2000 | Spies et al. | |
| 6,124,854 A | 9/2000 | Sartain et al. | |
| 6,138,221 A | 10/2000 | Korst et al. | |
| 6,170,006 B1 | 1/2001 | Namba | |
| 6,184,878 B1 | 2/2001 | Alonso et al. | |
| 6,212,549 B1 | 4/2001 | Page et al. | |
| 6,236,504 B1 | 5/2001 | Kao et al. | |
| 6,263,504 B1 | 7/2001 | Ebisawa | |
| 6,324,519 B1 | 11/2001 | Eldering | |
| 6,334,124 B1 | 12/2001 | Bouchard et al. | |
| 6,397,251 B1 | 5/2002 | Graf | |
| 6,463,508 B1 | 10/2002 | Wolf et al. | |
| 6,502,139 B1 | 12/2002 | Birk et al. | |
| 6,519,693 B1 | 2/2003 | Debey | |
| 6,614,366 B2 | 9/2003 | Luby | |
| 6,622,305 B1 | 9/2003 | Willard | |
| 6,630,963 B1 | 10/2003 | Billmaier | |
| 6,640,241 B1 | 10/2003 | Ozzie et al. | |
| 6,701,528 B1 | 3/2004 | Arsenault et al. | |
| 6,704,813 B2 | 3/2004 | Smirnov et al. | |
| 6,728,763 B1 | 4/2004 | Chen | |
| 6,731,605 B1 | 5/2004 | Deshpande | |
| 6,763,392 B1 | 7/2004 | del Val et al. | |
| 6,789,106 B2 | 9/2004 | Eyer et al. | |
| 6,801,947 B1 | 10/2004 | Li | |
| 6,804,719 B1 | 10/2004 | Cabrera | |
| 6,857,012 B2 | 2/2005 | Sim et al. | |
| 6,934,965 B2 | 8/2005 | Gordon et al. | |
| 6,938,258 B1 | 8/2005 | Weinberger et al. | |
| 6,944,585 B1 | 9/2005 | Pawson | |
| 6,970,937 B1 | 11/2005 | Huntington | |
| 6,973,667 B2 | 12/2005 | Fritsch | |
| 7,035,933 B2 * | 4/2006 | O'Neal et al. | 709/233 |
| 7,051,360 B1 | 5/2006 | Ellis et al. | |
| 7,080,400 B1 | 7/2006 | Navar | |
| 7,110,006 B2 | 9/2006 | MacInnis et al. | |
| 7,155,735 B1 | 12/2006 | Ngo et al. | |
| 7,174,385 B2 | 2/2007 | Li | |
| 7,188,357 B1 | 3/2007 | Rieschl et al. | |
| 7,191,215 B2 | 3/2007 | Ganesan et al. | |
| 7,228,556 B2 | 6/2007 | Beach et al. | |
| 7,240,359 B1 | 7/2007 | Sie et al. | |
| 7,246,369 B1 | 7/2007 | Duan et al. | |
| 7,260,829 B1 | 8/2007 | Hendricks et al. | |
| 7,324,555 B1 | 1/2008 | Chen et al. | |
| 7,360,235 B2 | 4/2008 | Davies et al. | |
| 7,379,963 B1 | 5/2008 | Khare et al. | |
| 7,386,874 B2 | 6/2008 | White et al. | |
| 7,552,382 B1 | 6/2009 | Munetsugu et al. | |
| 7,577,750 B2 | 8/2009 | Shen et al. | |
| 7,633,887 B2 | 12/2009 | Panwar et al. | |
| 7,698,451 B2 | 4/2010 | Ganesan | |
| 7,810,647 B2 | 10/2010 | Ganesan et al. | |
| 7,945,694 B2 * | 5/2011 | Luzzatti et al. | 709/234 |
| 2001/0019630 A1 | 9/2001 | Johnson | |
| 2001/0042249 A1 | 11/2001 | Knepper et al. | |
| 2001/0051998 A1 | 12/2001 | Henderson | |
| 2002/0012521 A1 | 1/2002 | Nagasaka et al. | |
| 2002/0022956 A1 | 2/2002 | Ukrainczyk | |
| 2002/0029282 A1 | 3/2002 | Buddhikot et al. | |
| 2002/0031331 A1 | 3/2002 | Kwoh et al. | |
| 2002/0053078 A1 | 5/2002 | Holtz et al. | |
| 2002/0091825 A1 | 7/2002 | Shuster | |
| 2002/0129375 A1 | 9/2002 | Kim et al. | |
| 2002/0131423 A1 | 9/2002 | Chan et al. | |
| 2002/0133491 A1 | 9/2002 | Sim et al. | |
| 2002/0143959 A1 | 10/2002 | El-Baze et al. | |
| 2002/0154703 A1 | 10/2002 | Kubota et al. | |
| 2002/0154892 A1 | 10/2002 | Hoshen et al. | |
| 2002/0162109 A1 | 10/2002 | Shteyn | |
| 2002/0163882 A1 | 11/2002 | Bornstein et al. | |
| 2003/0021244 A1 | 1/2003 | Anderson | |
| 2003/0026254 A1 | 2/2003 | Sim | |
| 2003/0028490 A1 | 2/2003 | Miura et al. | |
| 2003/0055893 A1 | 3/2003 | Sato et al. | |
| 2003/0078964 A1 | 4/2003 | Parrella et al. | |
| 2003/0084461 A1 | 5/2003 | Hoang | |
| 2003/0097661 A1 | 5/2003 | Li et al. | |
| 2003/0126277 A1 | 7/2003 | Son et al. | |
| 2003/0135867 A1 | 7/2003 | Guedalia | |
| 2003/0163646 A1 | 8/2003 | O'Neil | |
| 2003/0188316 A1 | 10/2003 | DePrez | |
| 2003/0188317 A1 | 10/2003 | Liew et al. | |
| 2003/0204613 A1 | 10/2003 | Hudson et al. | |
| 2003/0204856 A1 | 10/2003 | Buxton | |
| 2003/0208612 A1 | 11/2003 | Harris et al. | |
| 2004/0016000 A1 | 1/2004 | Zhang et al. | |
| 2004/0078460 A1 | 4/2004 | Valavi et al. | |
| 2004/0107242 A1 | 6/2004 | Vert et al. | |
| 2004/0123324 A1 | 6/2004 | Sazzad et al. | |
| 2004/0128343 A1 | 7/2004 | Mayer | |
| 2004/0133923 A1 | 7/2004 | Watson et al. | |
| 2004/0143672 A1 * | 7/2004 | Padmanabham et al. | 709/231 |
| 2004/0143850 A1 * | 7/2004 | Costa | 725/115 |
| 2004/0148634 A1 | 7/2004 | Arsenault et al. | |
| 2004/0148636 A1 | 7/2004 | Weinstein et al. | |
| 2004/0158867 A1 | 8/2004 | Mack et al. | |
| 2004/0202073 A1 | 10/2004 | Lai et al. | |
| 2004/0236869 A1 * | 11/2004 | Moon | 709/246 |
| 2004/0250286 A1 | 12/2004 | Fraser et al. | |
| 2004/0255323 A1 | 12/2004 | Varadarajan et al. | |
| 2004/0267822 A1 | 12/2004 | Curran et al. | |
| 2005/0010653 A1 | 1/2005 | McCanne | |
| 2005/0015511 A1 | 1/2005 | Izmailov et al. | |
| 2005/0033856 A1 | 2/2005 | Li | |
| 2005/0038724 A1 | 2/2005 | Roever et al. | |
| 2005/0041679 A1 | 2/2005 | Weinstein et al. | |
| 2005/0055425 A1 | 3/2005 | Lango et al. | |
| 2005/0055718 A1 | 3/2005 | Stone | |
| 2005/0066063 A1 | 3/2005 | Grigorovitch et al. | |
| 2005/0086696 A1 | 4/2005 | Daniels | |
| 2005/0097213 A1 | 5/2005 | Barrett et al. | |
| 2005/0108414 A1 | 5/2005 | Taylor et al. | |
| 2005/0177853 A1 | 8/2005 | Williams et al. | |
| 2005/0216941 A1 | 9/2005 | Flanagan et al. | |
| 2005/0259682 A1 | 11/2005 | Yosef et al. | |
| 2005/0267948 A1 | 12/2005 | McKinley et al. | |
| 2006/0008256 A1 | 1/2006 | Khedouri et al. | |
| 2006/0026663 A1 | 2/2006 | Kortum et al. | |
| 2006/0031537 A1 | 2/2006 | Boutboul et al. | |
| 2006/0034537 A1 | 2/2006 | Masaki | |
| 2006/0037037 A1 | 2/2006 | Miranz | |
| 2006/0075453 A1 | 4/2006 | Choi | |
| 2006/0095948 A1 | 5/2006 | Verhaegh et al. | |
| 2006/0106807 A1 | 5/2006 | DeVitis et al. | |
| 2006/0136597 A1 | 6/2006 | Shabtai et al. | |
| 2006/0174160 A1 | 8/2006 | Kim | |
| 2006/0184688 A1 | 8/2006 | Ganguly et al. | |
| 2006/0190615 A1 | 8/2006 | Panwar et al. | |
| 2006/0190975 A1 | 8/2006 | Gonzalez | |

(56) References Cited

U.S. PATENT DOCUMENTS

| | | | |
|---|---|---|---|
| 2006/0206889 A1 | 9/2006 | Ganesan et al. | |
| 2006/0218217 A1 | 9/2006 | Ganesan et al. | |
| 2006/0242153 A1 | 10/2006 | Newberry et al. | |
| 2007/0089146 A1 | 4/2007 | Ikeda et al. | |
| 2007/0143804 A1 | 6/2007 | Wang | |
| 2008/0022343 A1 | 1/2008 | Hodzic et al. | |
| 2008/0091840 A1 | 4/2008 | Guo et al. | |
| 2008/0134258 A1 | 6/2008 | Goose et al. | |
| 2008/0148323 A1 | 6/2008 | White et al. | |
| 2008/0205291 A1* | 8/2008 | Li et al. | 370/254 |
| 2008/0212945 A1 | 9/2008 | Khedouri et al. | |
| 2008/0256272 A1 | 10/2008 | Kampmann et al. | |
| 2008/0282298 A1 | 11/2008 | Ganesan et al. | |
| 2008/0301738 A1 | 12/2008 | Davies et al. | |
| 2009/0007196 A1 | 1/2009 | Ganesan | |
| 2009/0019174 A1* | 1/2009 | Ehn et al. | 709/231 |
| 2009/0019468 A1 | 1/2009 | Ganesan et al. | |
| 2009/0024573 A1 | 1/2009 | Zink | |
| 2009/0025046 A1 | 1/2009 | Ganesan et al. | |
| 2009/0025048 A1 | 1/2009 | Ganesan | |
| 2010/0030909 A1* | 2/2010 | Magharei et al. | 709/231 |
| 2010/0049867 A1* | 2/2010 | Panwar et al. | 709/231 |
| 2010/0223362 A1 | 9/2010 | Price | |
| 2010/0254675 A1 | 10/2010 | Ganesan | |
| 2011/0023072 A1 | 1/2011 | Hodzic et al. | |
| 2011/0093492 A1 | 4/2011 | Sull et al. | |
| 2011/0179449 A1 | 7/2011 | Ganesan et al. | |

OTHER PUBLICATIONS

Video-on-Demand Research, printable at http:llwww.cs. ndsu. nodak.edu/-rvetterlATM/html/video.html.

C. Siva Ram Murthy "A Primary-Segmented Backup Scheme for Fast Restoration of Real-Time Channels from Network Component Failures", printable at http://www.prl.ernet.in/-librarv/Hari%200m/Hari%200m%20Lecture/Sive%20Ram%20Murthy final.html.

Clifford A. Shaffer, A Practical Introduction to Data Structures and Algorithm Analysis Java Edition, 1998, 11 pgs.

Decision on Petition to Make Special dated Nov. 29, 2005 in U.S. Appl. No. 11/075,573, 1 pg.

Decision on Petition to Make Special dated Dec. 18, 2007 in U.S. Appl. No. 11/974,138, 2 pgs.

Decision on Petition to Make Special dated Apr. 16, 2005 in U.S. Appl. No. 11/077,411, 1 pg.

Final Office Action dated Dec. 3, 2008 in U.S. Appl. No. 11/458,384, 24 pgs.

Final Office Action dated Mar. 18, 2008 in U.S. Appl. No. 11/075,573, 18 pgs.

Final Office Action dated Dec. 29, 2008 in U.S. Appl. No. 11/210,272, 19 pgs.

Final Office Action dated Apr. 24, 2006 in U.S. Appl. No. 11/077,411, 7 pgs.

International Preliminary Report on Patentability and Written Opinion in the International Application PCT/US2005/020051, World Intellectual Property Organization, European Patent Office, Apr. 3, 2007, 4 pages.

International Preliminary Report on Patentability andSearching Authority in the International Application PCT/US2006/007070, World IntellectualProperty Organization, European Patent Office, Sep. 12, 2007,7 pages Written Opinion of the International.

International Search Report and Written Opinion of the International Searching Authority inInternational Application PCT/US2006/007070, European Patent Office, Apr. 19, 2007, 9 pages.

International Search Report and Written Opinion of the International Searching Authority inInternational Application PCT/US2006/007070, European Patent Office, Feb. 27, 2006, 12 pages.

International Search Report International Searching Authority inInternational Application PCT/US2005/020051, European Patent Office, Mar. 9, 2007, 3 pages.

Jehan-Francois Paris et al., "Zero-Delay Broadcasting Protocols for Video-on-Demand," Proceedings of the 7th ACM International Conference on Multimedia '99, Oct. 30-Nov. 5, 1999, Orlando, FL, USA. ACM,1999, vol. 1.

Jim Ferrara, Creating and Maintaining a Hierarchical Directory, Nov. 2002, 14 pgs.

Lisa Payne, Web Authoring Inline Images, Jan. 2002, 4 pgs.

Non-Final Office Action dated Apr. 29, 2008 in U.S. Appl. No. 11/458,384, 24 pgs.

Non-Final Office Action dated Sep. 23, 2008 in U.S. Appl. 11/684,637, 5 pgs.

Non-Final Office Action dated Aug. 28, 2006 in U.S. Appl. No. 11/077,411, 10 pgs.

Non-Final Office Action dated Mar. 11, 2009 in U.S. Appl. No. 11/492,673, 12 pgs.

Non-Final Office Action dated Jun. 20, 2008 in U.S. Appl. No. 11/210,272, 16 pgs.

Non-Final Office Action dated Mar. 13, 2009 in U.S. Appl. No. 11/278,416, 9 pgs.

Non-Final Office Action dated Dec. 26, 2008 in U.S. Appl. No. 11/150,653, 26 pgs.

Non-Final Office Action dated Nov. 25, 2008 in U.S. Appl. No. 11/075,573, 18 pgs.

Non-Final Office Action dated Oct. 28, 2008 in U.S. Appl. No. 10/867,155, 12 pgs.

Non-Final Office Action dated Oct. 17, 2007 in U.S. Appl. No. 11/075,573, 13 pgs.

Non-Final Office Action dated Jan. 30, 2006 in U.S. Appl. No. 11/077,411, 6 pgs.

Notice of Allowance dated Jan. 16, 2007 in U.S. Appl. No. 11/077,411, 4 pgs.

Petition to Make Special dated Mar. 9, 2005 in U.S. Appl. No. 11/077,411, 52 pgs.

Petition to Make Special dated Oct. 10, 2007 in U.S. Appl. No. 11/974,138, 9 pgs.

Video-on-Demand Research, from http://www.cs. ndsu.nodak.edu/-rvetterIATM/html/video.html, dated Oct. 31, 2005, North Dakota State University, Computer Science Department, 2 pgs., Oct. 31, 2005.

C. Siva Ram Murthy "A Primary-Segmented Backup Scheme for Fast Restoration of Real-Time Channels from Network Component Failures", from http://www.prl.ernet.in/-librarv/Hari%200m/Hari%200m%20Lecture/Siva%20Ram%20Murthy final.html, dated Oct. 31, 2005, Indian Institute of Technology, Department ofComputer Science and Engineering, 8 pgs, Oct. 31, 2005.

Election/Restriction Requirement dated Oct. 28, 2009 in U.S. Appl. No. 11/404,972, 6 pgs.

Final Office Action date Jan. 21, 2010 in U.S. Appl. No. 11/075,573, 24pages.

Final Office Action dated Aug. 31, 2009 in U.S. Appl. No. 11/492,673, 16 pgs.

Final Office Action dated Sep. 30, 2009 in U.S. Appl. No. 11/269,462, 27 pgs.

Final Office Action date May 5, 2010 in U.S. Appl. No. 11/269,462, 10 pages.

Final Office Action dated Jan. 21, 2010 in U.S. Appl. No. 11/515,267, 11 pgs.

Final Office Action dated Aug. 31, 2009 in U.S. Appl. No. 11/278,416, 15 pgs.

Final Office Action date Aug. 4, 2009 in U.S. Appl. No. 11/076,214, 16 pages.

Final Office Action dated Aug. 14, 2009 in U.S. Appl. No. 11/150,653, 27 pgs.

Final Office Action Mar. 18, 2010 in U.S. Appl. No. 11/331,113 15pages.

Final Office Action date Mar. 26, 2010 in U.S. Appl. No. 11/930,147, 13 pages.

Francois, Alexandre R.J., "A Hybrid Architectural Style for Distributed Parallel Processing of Generic Data Streams" May 2004, IEEE Computer Society, ICSE '04: Proceedings of the 26th International Conference on Software Engineering, pp. 1-10.

Guo, Yang et al., "P2Cast: Peer-to-peer Patching Scheme for VoD Service" May 2003, ACM, WWW '03: Proceedings of the 12th international conference on World Wide Web, pp. 301-309.

(56) References Cited

OTHER PUBLICATIONS

International Preliminary Report on Patentability and Written Opinion of the International Searching Authority in International Application PCT/US2008/071735, European Patent Office, Feb. 11, 2010, 7 pages.
Non-Final Office Action dated Sep. 10, 2008 in U.S. Appl. No. 11/515,267, 9 pgs.
Non-Final Office Action dated Jun. 30, 2008 in U.S. Appl. No. 11/075,573, 19 pgs.
Non-Final Office Action dated Jul. 2, 2009 in U.S. Appl. No. 11/331,113, 14 pgs.
Non-Final Office Action dated Jul. 20, 2009 in U.S. Appl. No. 11/930,147, 14 pgs.
Non-Final Office Action dated Jun. 11, 2009 in U.S. Appl. No. 11/210,272, 23 pgs.
Non-Final Office Action dated Dec. 16, 2009 in U.S. Appl. No. 11/684,637, 5 pgs.
Non-Final Office Action date Dec. 23, 2008 in U.S. Appl. No. 11/076,214,19pages.
Non-Final Office Action Mar. 12, 2010 in U.S. Appl. No. 11/150,653 29pages.
Non-Final Office Action date Mar. 4, 2010 in U.S. Appl. No. 11/076,214, 13 pages.
Non-Final Office Action date Mar. 24, 2010 in U.S. Appl. No. 11/404,972, 10 pages.
Non-Final Office Action date Apr. 12, 2010 in U.S. Appl. No. 11/492,673, 11 pages.
Notice of Allowance dated Nov. 2, 2009 in U.S. Appl. No. 11/685,101, 6 pgs.
Petition to Make Special dated Oct. 31, 2005 in U.S. Appl. No. 11/075,573, 16 pgs.
U.S. Appl. No. 11/150,653, Ganesan et al., filed Jun. 11, 2005.
U.S. Appl. No. 11/404,972, Ganesan, filed Apr. 13, 2006.
U.S. Appl. No. 11/515,267, Ganesan, filed Sep. 1, 2006.
U.S. Appl. No. 11/927,690, Ganesan et al., filed Oct. 30, 2007.
Communication of Dec. 16, 2010 in European Application No. 08796939.0/1244.
Final Office Action dated Sep. 17, 2010 in U.S. Appl. No. 11/150,653; 31 pages.
Final Office Action dated Sep. 28, 2010 in U.S. Appl. No. 11/492,673, 12 pages.
Final Office Action dated Aug. 30, 2011 in U.S. Appl. No. 11/492,673.
Final Office Action dated Jul. 22, 2011 in U.S. Appl. No. 11/075,573.
Final Office Action dated Oct. 14, 2010 in U.S. Appl. No. 11/076,214, 12 pages.
Final Office Action dated Oct. 19, 2011 in U.S. Appl. No. 11/278,416.
Final Office Action dated Feb. 10, 2011 in U.S. Appl. No. 11/515.267, 12 pages.
Ma et al., "Reducing bandwidth requirement for delivering video over wide area networks with proxy server", IEEE, 2002, vol. 4, Iss. 4, p. 539-550.
Non-Final Office Action date Aug. 2, 2010 in U.S. Appl. No. 11/515,267; 14 pages.
Non-Final Office Action dated Feb. 25, 2011 in U.S. Appl. No. 11,075,573, 27 pages.
Non-Final Office Action dated Mar. 14, 2011 in U.S. Appl. No. 11/150,653.
Non-Final Office Action dated Mar. 14, 2011 in U.S. Appl. No. 11/492,673, 15 pages.
Non-Final Office Action dated Apr. 21, 2011 in U.S. Appl. No. 11/278,416.
Non-Final Office Action dated Sep. 22, 2011 in U.S. Appl. No. 11/515,267.
Non-Final Office Action dated Oct. 5, 2011 in U.S. Appl. No. 12/699,848.
Notice of Allowance dated Jun. 10, 2010 in U.S. Appl. No. 11/684,637; 8 pages.
Notice of Allowance mailed Sep. 13, 2011 in U.S. Appl. No. 11/150,653.
Ramesh et al., "Multicast with cache (Mcache): an adaptive zero-delay video-on-demand service", IEEE, 2001. vol. 11, Iss. 3; p. 440-456.

* cited by examiner

LIVE VIDEO BROADCASTING ON DISTRIBUTED NETWORKS

CROSS-REFERENCE TO RELATED APPLICATION

This is a continuation-in-part of U.S. application Ser. No. 11/684,637, entitled "Method and apparatus for supporting file sharing in a distributed network" and filed Mar. 12, 2007, now U.S. Pat. No. 7,810,647, which is a continuation of U.S. application Ser. No. 11/077,411, entitled "Method and system for providing instantaneous media-on-demand services by transmitting contents in pieces from client machines" and filed Mar. 9, 2005, now U.S. Pat. No. 7,191,215.

BACKGROUND

1. Technical Field

The present invention relates generally to the area of delivering multimedia services over the Internet, and more particularly to techniques for distributing live programs (e.g., video or audio) to subscribers using a data network, where client machines associated with the subscribers are configured to provide needed bandwidths to deliver the live programs with a minimum delay.

2. Description of the Related Art

Live programs, such as Oscar award evening, are traditionally broadcast over the air, in cable or via satellite. Since the Internet has been introduced as an alternative type of medium to reach the audience, efforts to broadcast live programs have led to many paradigms surrounding the well-known client-server architecture. In the server-client architecture, a server starts to feed a stream of a live program to a client upon receiving an order therefrom. Although the server-client architecture is relatively easy to implement and deployed, it was soon proved to be inefficient and incapable of supporting a large number of requests. When a live program becomes highly demanding, a server or a cluster of servers start to experience the bandwidth pressures when more and more clients request the same program at the same time.

One of the proposals to avoid the bandwidth pressures is to use distributed networks, namely each of participating client machines becoming potentially a server to provide feeding data to an ordering machine. An example is BitTorrent which is a peer-to-peer file sharing (P2P) communications protocol. BitTorrent is a method of distributing large amounts of data widely without involving an original distributor. Instead, when data is distributed using the BitTorrent protocol, recipients each supply data to newer recipients, reducing the cost and burden on any given individual source, providing redundancy against system problems, and reducing dependence upon the original distributor. However, BitTorrent does not support an "instant" playback of an ordered program. Often a user has to wait for an unpredicatble amount of time before data from different places is received and assembled for playback. So BitTorrent, as of the current status, could hardly support a live broadcasting program.

Figure 1:
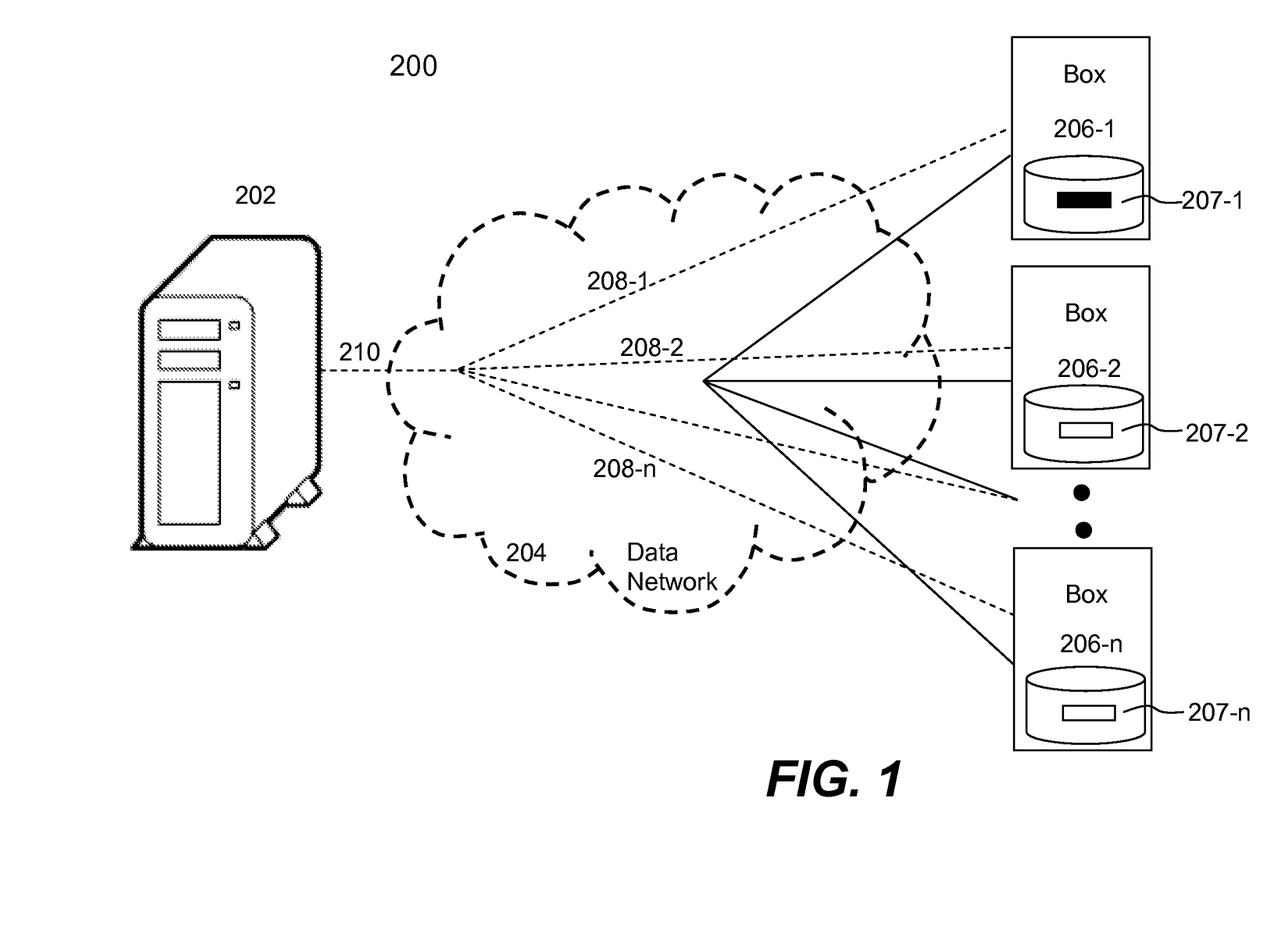
FIG. 1 duplicates FIG. 2A of U.S. Pat. No. 7,191,215, that shows an exemplary configuration of a distributed network system.

U.S. Pat. No. 7,191,215 discloses unique techniques of providing media services among clients with a central server as a manager or regulator. FIG. 1 duplicates FIG. 2A of U.S. Pat. No. 7,191,215, that shows an exemplary configuration 200 of a distributed network system. A server 202, presumably managed and/or populated by a service provider, is configured to handle the delivery of video (or multimedia) services to users via local machines or boxes 206-1, 206-2, . . . 206-$n$. Different from the client-server architecture in which a server is caused deliver video data to a subscriber upon receiving a request therefrom, the server 202 is not responsible for delivering the content in response to a request from a user, and instead, it is configured to provide source information as to where and how to retrieve at least some of the content from other clients (e.g., boxes). In other words, a server in the typical client-server architecture requires to have a direct access the content when servicing the clients, while the server 202 does not need necessarily to access the content to provide the content to the clients. Instead, some of the boxes 206-1, 206-2, . . . 206-$n$ are respectively configured to supply part or all of the content to each other.

According to one embodiment, when fulfilling a request from a local machine or a box (e.g., 206-1), communication between the server 202 and the box 206-1 over the network paths 208-1 and 210 may be limited to small-scale requests and responses (e.g., of small size and very short). A server response to a request from a box may include source information (e.g., identifiers), authorization information and security information. Using the response from the server 202, the box may be activated to begin playback of a title (e.g., 207-1). Substantially at the same time, the box may initiate one or more requests to other boxes (e.g., 206-2 and 206-$n$) in accordance with the source identifiers to request subsequent portions of the title (e.g., 207-2 and 207-$n$). Assuming proper authorization, the requesting box receives the subsequent portions of the data concurrently from the other boxes. Because of box-to-box communication of content, the bandwidth requirement for box-to-server communications over the network paths 208-1 and 210 is kept low and typically short in duration.

In one aspect, U.S. Pat. No. 7,191,215 has fundamentally resolved the bandwidth issues that are experienced in the client-server architecture and made an entire video delivery system independent from the number of the users. In reality, U.S. Pat. No. 7,191,215 performs better with more users because more client machines available to supply requested data means more bandwidths for servicing others, while the client-server architecture starts to hit its limits when the number of its users exceeds a certain number.

The present invention discloses techniques for distributing a live broadcast program using a distributed network. As will be appreciated by those skilled in the art, one embodiment of the present invention may be advantageously used in a system designed in accordance with U.S. Pat. No. 7,191,215 but can also be used in general for distributing live contents over distributed networks.

SUMMARY

This section is for the purpose of summarizing some aspects of embodiments of the present invention and to briefly introduce some preferred embodiments. Simplifications or omissions in this section as well as in the title and the abstract of this disclosure may be made to avoid obscuring the purpose of the section, the title and the abstract. Such simplifications or omissions are not intended to limit the scope of the present invention.

Broadly speaking, the invention relate to techniques for providing media services over data networks. The techniques described herein are related to providing a live program over the Internet. A distributed network traditionally considered for delivering contents that are not of live or instant nature, the present invention discloses techniques of delivering live programs relying on client machines (e.g., boxes) by peer-to-peer communication. According to one aspect of the present invention, a data stream representing a live program is preprocessed to produce a plurality of substreams, each of the substreams comprising decimated samples of the data stream, wherein the data stream is continuously coming till the live program ends. The number of substreams is relatively large so that the bandwidth requirement for delivering one of the substreams is relatively low. To playback the live program on an ordering box, the substreams are preferably streamed in nearly simultaneously so that data blocks can be multiplexed to recover the data stream for the playback.

With a group of seeding boxes receiving the substreams, a group of boxes in services are designated to receive the substreams from the seeding boxes, each of these boxes including the seeding boxes is able to support multiple outbound streams (e.g., greater than 2) so that there are enough data suppliers to service the ordering boxes or colonize more boxes to become the data suppliers. At the same time, each of the ordering boxes is a potential data supplier to supply one or more of the substreams to other ordering boxes.

One of the important features in the present invention is to generate a fairly large number of substreams from a data stream representing a live program, each of the substreams requiring a low bandwidth for transmission over a network. As a result, boxes that have a sufficient downloading bandwidth to receive a substream and a sufficient uploading bandwidth to supply the substream to more than two other boxes are qualified to be the data suppliers of the live program. Essentially, the computation and bandwidth burdens that would otherwise be on a server are now distributed to such boxes.

Embodiments of the invention may be implemented in numerous ways, including a method, system, device, or a computer readable medium. Several embodiments of the invention are discussed below. In one embodiment, the invention provides a method for distributing a live program over a distributed network, the method comprises: preprocessing a data stream representing the live program into a plurality of substreams, each of the substreams comprising decimated samples of the data stream, wherein the data stream is continuously coming till the live program ends; identifying boxes in service that are idle; selecting a set of seeding boxes from the idle boxes to receive the substreams; and causing the seeding boxes to propagate the substreams as being received to other of the idle boxes so that there are a sufficient number of suppliers to provide the substreams to ordering boxes.

In another embodiment, the invention provides a system for distributing a live program over a distributed network, the system comprises a server configured to generate N substreams that are created from a data stream representing the live program into, each of the N substreams comprising decimated samples of the data stream, wherein the data stream is continuously coming till the live program ends, and N is a finite integer; a plurality of boxes in service that are idle, wherein a set of seeding boxes from the idle boxes is selected to receive the substreams from the server and caused to propagate the N substreams as being received to other of the idle boxes; and a plurality of ordering boxes to order the live program, each of the ordering boxes receiving the N substreams from N of the idle boxes, wherein each of the N of the idle boxes is capable of servicing one or more ordering boxes.

One of the objects, features, and advantages of the present invention is to provide a mechanism for broadcasting a live program over a distributed network.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 4A shows a pipeline structure to propagate a substream being received to a number of boxes serially;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

Embodiments of the present invention are discussed herein with reference to FIGS. 1-5B. However, those skilled in the art will readily appreciate that the detailed description given herein with respect to these figures is for explanatory purposes only as the invention extends beyond these limited embodiments.

Typically, broadcasting a live event involves these major parts, audio and/or video capture, signal acquisition, content encoding, and delivery or distribution. The first piece of any live event is audio and video content. Some events consist of just an audio component, such as a quarterly corporate release call, while others consist of video as well as audio, such as Oscar award evening. The first step in any live event is being able to record and film the content, otherwise known as "audio and/or video capture".

Once the audio/video content is captured, a signal acquisition process is immediately followed. The signal is transmitted to a location where it can be encoded. This process is typically done a few different ways depending on the event. The signal can be sent to a satellite in the sky (typically refereed to as "uplinking") where it is then pulled down (otherwise known as "downlinking") at the service provider's offices for encoding. Another way to capture the signal can be via a phone bridge, say if the live event content consists of just a conference call. The signal can also be sent via connectivity at the event location if the content is being encoded on-site from the venue.

After the signal has been acquired, it needs to be encoded for distribution over the Internet. Encoding the content includes taking the audio/video signal and transforming it into a streaming media file format ready for distribution on the Internet. Encoding is done by using an "encoder", a hardware based device with capture cards and software that allows the signal to be digitized into one of file formats that can be placed back on a computer device. Now that the content has been captured, acquired and encoded, it is ready for delivery, which also can be referred to as "distribution".

In the context of the present invention, broadcasting a live program includes broadcasting a live event, further it includes broadcasting data that is preferably viewed/listened/executed at the time the data is being released over the internet. Accordingly, one aspect of the present invention pertains to distributing the encoded data (that may also be compressed) using distributed networks with a minimum delay in time.

Figure 2:
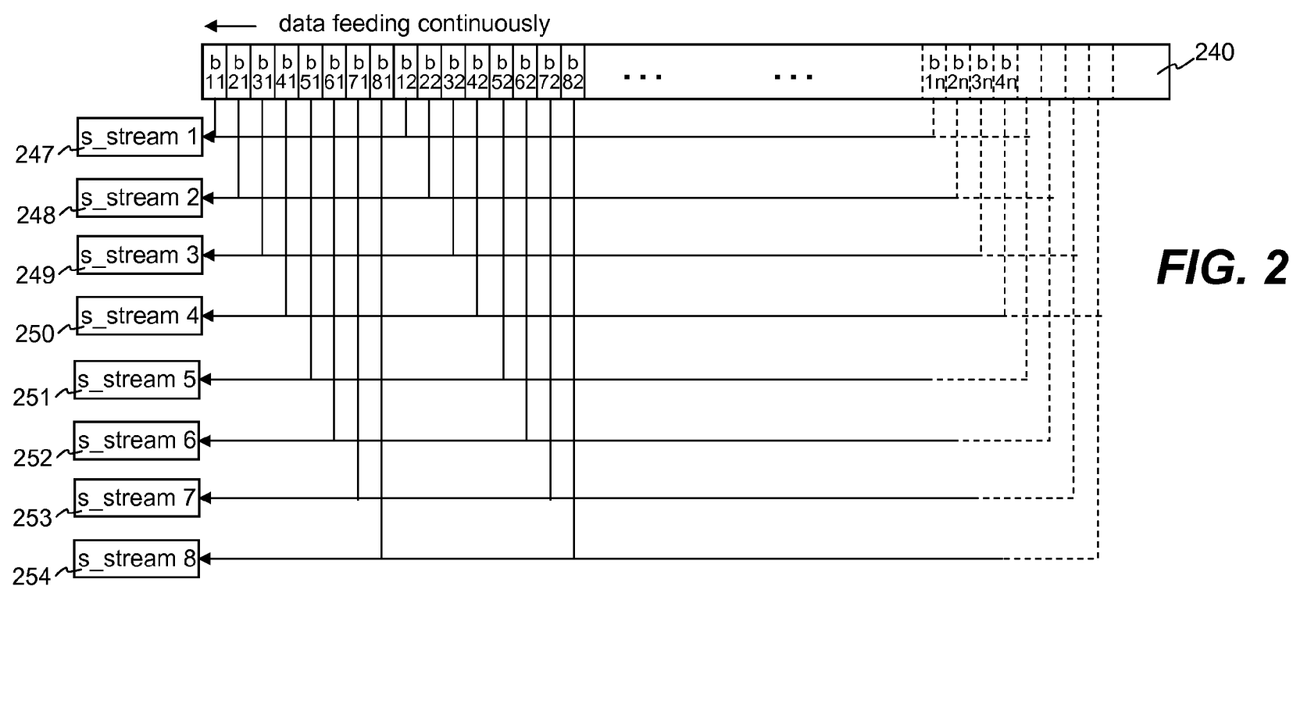
FIG. 2 shows that a data stream representing a live program is being preprocessed to produce eight substreams.

For convenience, it is assumed herein data (e.g., audio and/or video) representing a live program is presented in a data stream (or a streaming data file) that comes in until the live program ends. When an order for a live program is placed, a corresponding stream (namely, the beginning portion thereof) must be available for playback. To take advantage of the available bandwidths on the side of the client machines (e.g., boxes), and minimize the delay caused by the distribution of the data over the network, the data stream is preprocessed as shown in FIG. 2. As a live program is going on, a data stream 240 representing the live program is divided into a plurality of interleaved data substreams, for example, 50-100 substreams. To illustrate what an interleaved data substream is, FIG. 2 shows that a data stream 240 is being preprocessed to form eight interleaved data substreams 247-254. The data substreams 247-254 are produced or formed by respectively sampling the data stream 240 in a decimated manner.

In operation, as the data stream 240 comes in (until the live program ends), a certain sized data block goes to (or is sampled to) each of the substreams 247-254, in a sequential order repeatedly. For example, there are eight substreams, a 1st block goes to a first substream, a 2nd data block goes to a second substream, and a 8th data block goes to a eighth substream. As 9th, 10th, . . . 16th data block come, they go to the first, the second, . . . and the eighth substreams, respectively. In another perspective, an n-th data block in each of the substreams 247-254 is one of the eight successive data blocks in the data stream 240. In one embodiment, a data block comprises a chunk of data, for example, 256 Kbytes or 1 Mbyte. As a result, each of the data substreams 247-254 includes a plurality of interleaved data blocks from the data stream 240.

As shown in FIG. 2, the data stream 240 is expressed in data blocks as follows: b11, b21, b31, b41, b51, b61, b71, b81, b12, b22, b32, b42, b52, b62, b72, b82, . . . b1$n$, b2$n$, b3$n$, b4$n$, b5$n$, b6$n$, b7$n$, b8$n$. With the decimated sampling, the eight substreams 247-254 obtained can be respectively expressed as follows:

substreams 1={b11,b12,b13,b14 . . . };

substreams 2={b21,b22,b23,b24 . . . };

substreams 3={b31,b32,b33,b34 . . . };

substreams 4={b41,b42,b43,b44 . . . };

substreams 5={b51,b52,b53,b54 . . . };

substreams 6={b61,b62,b63,b64 . . . };

substreams 7={b71,b72,b73,b74 . . . }; and substreams 8={b81,b82,b83,b84 . . . }.

where b stands for "data block", numerals after "b" are mere reference numbers. As used above, the data blocks b11, b21, b31, b41, b51, b61, b71, b81, b12, b22, b32, b42, b52, b62, b72, b82, . . . b1$n$, b2$n$, b3$n$, b4$n$, b5$n$, b6$n$, b7$n$, b8$n$ are sequential while, for example, data blocks b11, b12, b13, b14 . . . b1$n$ in substreams 1 are not sequential (interleaved). In other words, the data blocks in each of the substreams are non-sequential. Data streams from all substreams must be multiplexed to reproduce useful (sequential) data for playback on an ordering box.

Instead of counting on limited computation power and bandwidth of a server, one of the features in the present invention is to utilize that of the boxes in service and distributed in the network. Typically, there are tens and thousands of boxes in service by a service provider. At the time of broadcasting a live program, there can be a substantial number of boxes that are not used to fulfill an order (e.g., playing back a movie, or browsing the Internet) or boxes that are not fully occupied. These boxes, referred to herein as being idle at the time, may contribute substantially to the required computation power as well as the required bandwidth to deliver the live program to those boxes that have ordered the live program from the service provider.

For example, for a typical residential environment, a downloading speed is about 1.3 Mbps while an uploading speed is 330 Kbps, and the data stream of a live program requires a transmission speed of 900 Kbps. If the data stream is being preprocessed to form sixty substreams that are being distributed to sixty idle boxes, either from the server or from other idle boxes, these sixty idle boxes can be designated to provide the substreams to ordering boxes, each substream at an uploading speed of 15 Kbps that can readily achieved in the residential environment.

In one embodiment, there may be many idle boxes, but only those idle boxes that have a sufficient uploading bandwidth to serve multiple ordering boxes are designated by the server to be data suppliers of the live program, thus receiving the substreams from the servers. The minimum requirement of an idle box to be a supplier is that the uploading bandwidth thereof can support at least two substreams, namely, an idle box that is qualified to be a data supplier can serve at least two others (e.g., ordering boxes or other idle boxes).

Figure 3A:
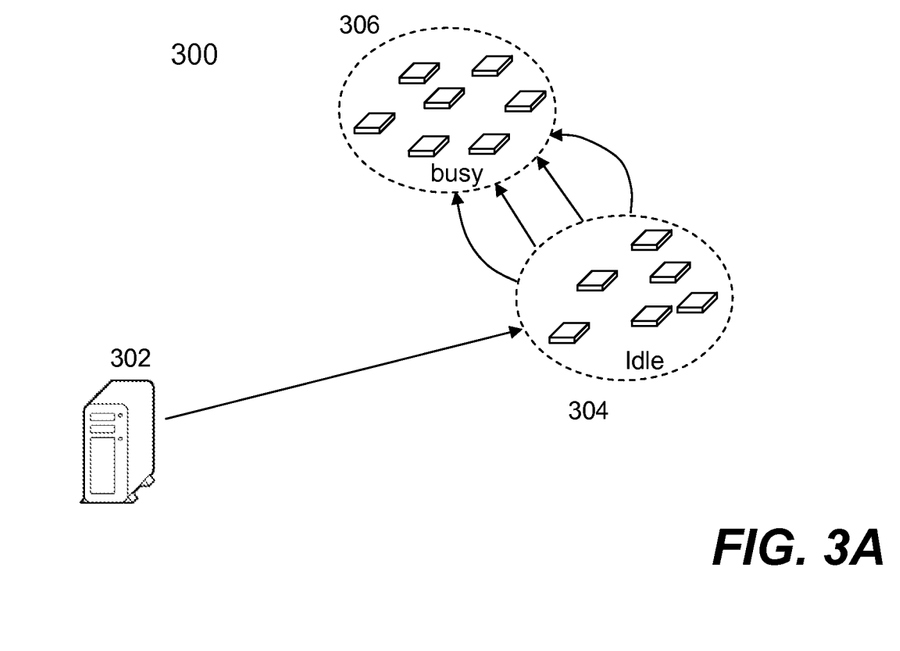
FIG. 3A shows an exemplary configuration of delivering a live program using some of the boxes in service to serve the ordering boxes.

FIG. 3A shows a configuration 300 of delivering a live program using some of the idle boxes in service to serve the ordering boxes. It is assumed that a server 302, representing a single server or a cluster of servers, distributes substreams to identified idle boxes 304. On behalf of the server 302, the idle boxes 304 are caused to fulfill the orders of the live program from the ordering boxes by feeding the required substreams thereto, thus alleviating the computation and bandwidth pressures on the server 302.

Figure 3B:
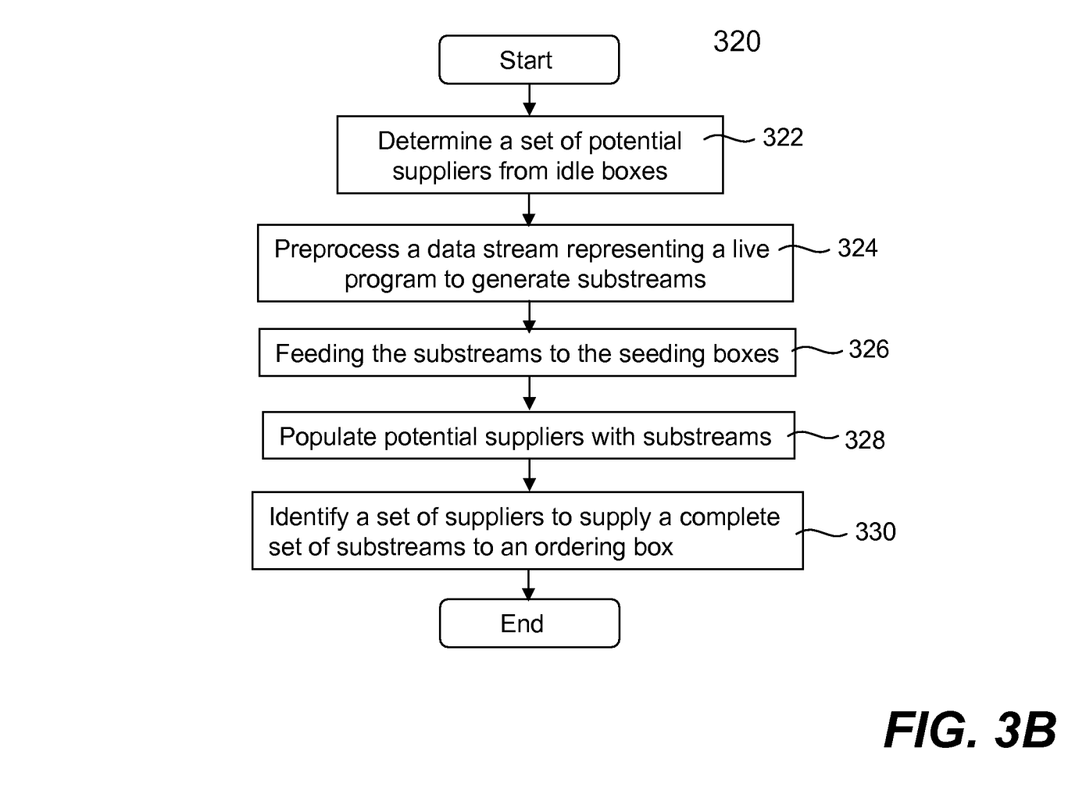
FIG. 3B shows a flowchart or process of serving a live program using a distributed network according to one embodiment of the present invention.

FIG. 3B shows a flowchart or process 322 of serving a live program using a distributed network according to one embodiment of the present invention. The process 322 may be understood in conjunction with FIG. 3A, and implemented in software, hardware, or in a combination of both. At 322, the process 322 determines a set of seeding boxes from the idle boxes. In one embodiment, a server has a status record of all boxes in service to show which ones are currently busy (e.g., playing back an ordered movie or uploading a data stream to another box) and which ones are not busy or could contribute to the delivery of the live program, also referred to herein as eligible boxes. Those being eligible are identified as the potential data suppliers of the substreams to others for the live program. In another embodiment, the server determines an uploading bandwidth a box has. A box will be identified as a potential supplier when the available uploading bandwidth thereof is sufficient to serve at least two other boxes in accordance with the required transmission rate (e.g., related to the encoding and decoding rates for successful playback) and the number of substreams. For example, a data stream of a live program requiring a transmission rate of 900 Kbps is partitioned into 60 substreams. Accordingly, if a box has an at least 30 Kbps uploading bandwidth, it will be considered as a potential supplier. In any case, among the potential suppliers, the server selects a set of seeding boxes to receive the substreams directly therefrom. Although it is possible to designate more seeding boxes to directly receive the substreams from the server, the more seeding boxes there are, the more computation and bandwidth are required form the server. Thus depending on the computation power and the bandwidth of the server, the set of the seeding boxes may be an exact number of the substreams, one to receive a substream, or more in which two or more to receive a substream.

At 324, the data stream representing the live program is preprocessed to generate the substreams. The number of the substreams is determined in accordance with a number of factors. For example, the factors include, but may not be limited to, a required transmission rate of a video over a network, a number of data suppliers required to supply the substreams to an ordering device, a number of eligible boxes or boxes that could potentially become the suppliers, and available uploading and downloading bandwidths of the boxes in service.

Given the selected set of potential suppliers from the idle boxes, at 326, the server can be configured to start to stream the substreams, respectively, to the seeding boxes. For example, one of the seeding boxes is caused to receive one substream as the substream becomes available. It should be noted that the bandwidth pressure on the server is not increased although the server is configured to feed, for example, N substreams to N boxes, which is equivalent to feed a data stream of the live program to a single box.

As the seeding boxes are receiving the substreams, they are configured to propagate the received data to other eligible boxes that can be the potential suppliers at 328. One of the purposes is to colonize more eligible boxes to receive the substrates so that more ordering boxes may be served, and at the same time, there are still sufficient data suppliers should some of the eligible boxes become ordering boxes (e.g., some subscribers order the live program in the middle of the program). Although there are ways to propagate the received data to other eligible boxes, according to one embodiment, a scheme is adopted to propagate the substreams to other the eligible boxes with a minimum delay in time. The details of exemplary propagating the received data of a substream to other eligible boxes will be described below.

At 330, a set of data suppliers is identified to serve an ordering box. As the eligible boxes are receiving the substreams from the server or other eligible boxes, a set of the eligible boxes is designated by the server to serve the ordering box. As described above, each eligible data supplier is capable of servicing at least two ordering boxes, an eligible data supplier may be designed to provide a substream being received to two or more ordering boxes or a combination of ordering boxes and other eligible boxes.

It should be noted, however, while an ordering box is receiving all the substreams from a set of suppliers, it may be designated as a supplier to supply one or more of the substreams being streamed to another ordering box.

Figure 4A:
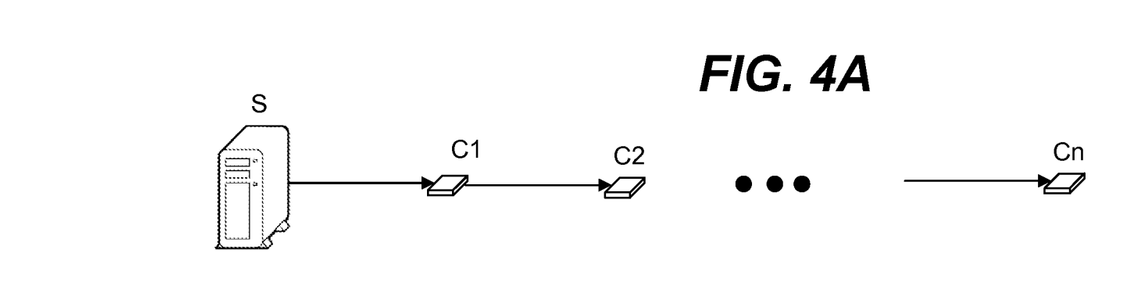
FIG. 4A shows a flowchart or process of managing the distribution of segments pertaining to a title to boxes in services according to one embodiment of the present invention.

FIG. 4A shows an exemplary pipeline structure to propagate a substream being received to a number of boxes that are designed to receive such a substream. As the server releases a substream block by block to C1 that pipelines it to C2 and so on till to Cn. The completion time for this structure will be k(n−1) ticks, assuming it takes k ticks (a time unit) to get one data block from one device to another. The completion time in the pipeline structure depends linearly on the number of boxes to be populated with one substream.

Figure 4B:
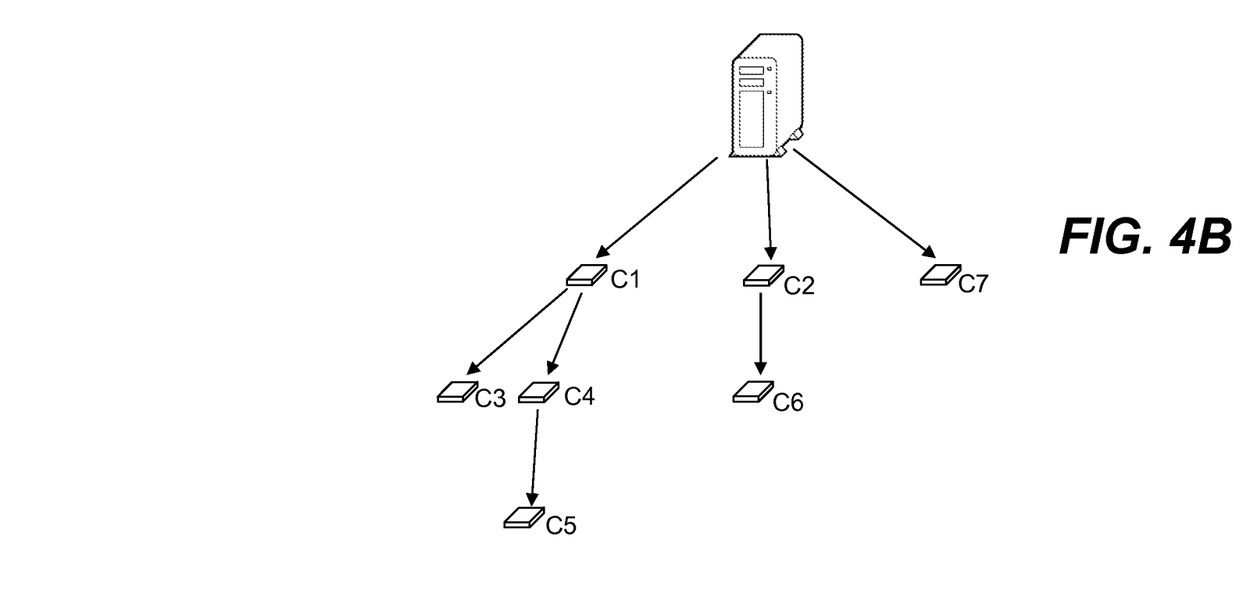
FIG. 4B shows a multicast tree by arranging all eligible boxes in a d-ary (d>1) tree structure with a minimum delay in time.

FIG. 4B shows a multicast tree by arranging all eligible boxes in a d-ary (d>1) tree structure. If all the eligible boxes and the server are represented by N nodes. There will be at most $\log_d N$ layers, resulting in a completion time being $k \times \log_d N$ ticks, again it is assumed that it takes k ticks (a time unit) to get one data block from one device to another. The completion time in the multicast tree depends logarithmically on the number of boxes to be populated with one type of the substreams. It could be appreciated by those skilled in the art that the tree structure may be optimized to minimize the delay in time in propagating the substreams to all eligible boxes or in colonizing the eligible boxes to receive the substreams.

Figure 4C:
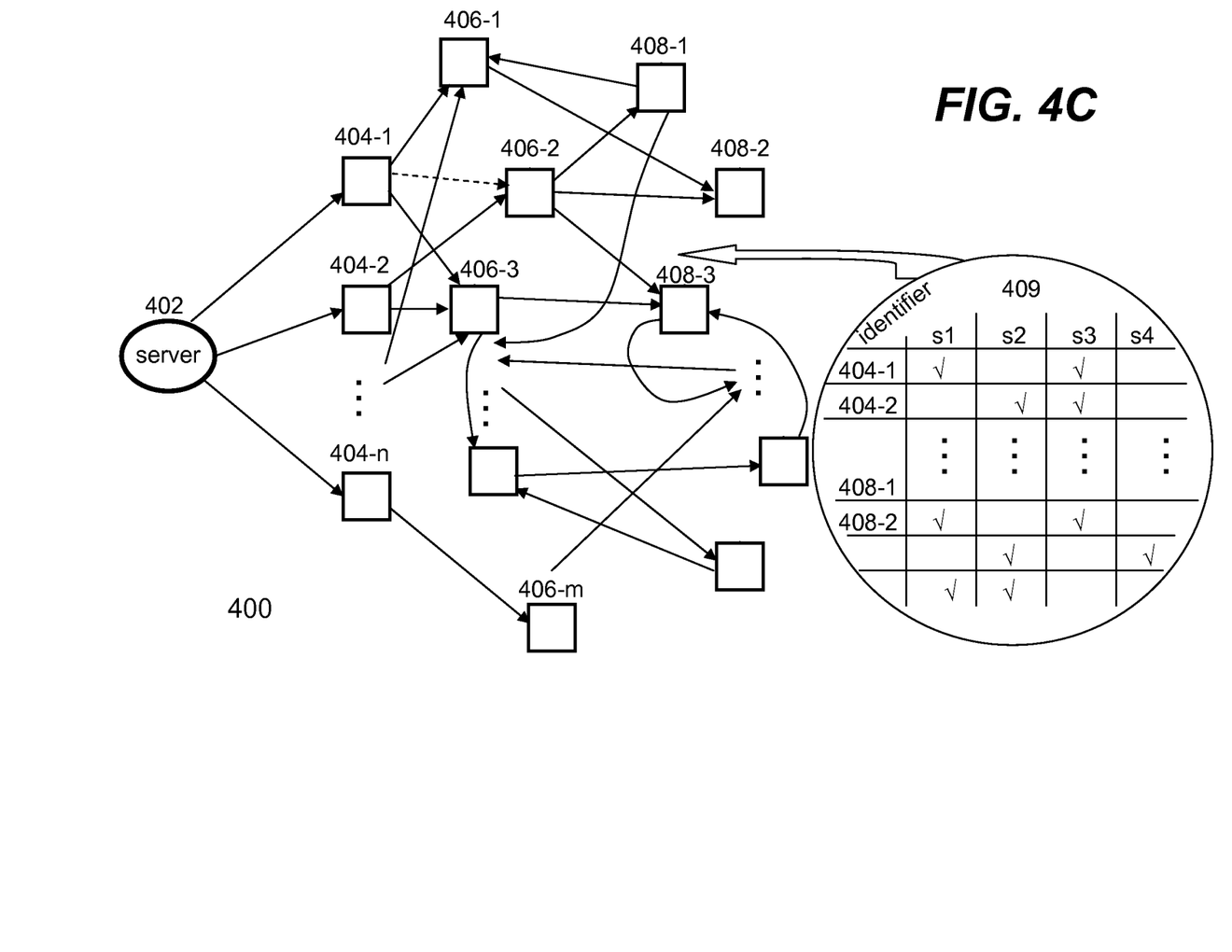
FIG. 4C shows a diagram of distributing substreams to eligible boxes using a random approach.

FIG. 4C shows a diagram 400 of distributing the substreams to eligible boxes using what is referred to as a gossip protocol. Instead of predetermining which eligible boxes are supposed to receive the substreams from which boxes, the way of colonizing the eligible boxes to receive the substreams is somehow random. When a server starts to release the substreams, it is configured to prepare the substreams into a number of data chunks. A data chunk is an atomic unit of data transfer from the server to the boxes, or between two boxes. For example, each of the data chunks may be 1 Mbyte in size and uniquely identified. Depending on implementation, each data chunk may contain one or more data blocks from one substream. In one embodiment, the server prepares a sourcing instruction in metadata about the substreams. The instruction, for example, describes which box gets which one of the substreams. The instruction once received causes an eligible box to retain the data blocks pertaining to the substream that it is supposed to receive.

The instruction, once prepared by the server, is propagated to all eligible boxes either via direct communication between the server and a box, or by box-to-box propagation of the instruction via a gossip protocol which is an application-layer multicast-like protocol. In general, each of the eligible boxes is configured to receive a specific subset of the data chunks that make up a substream assigned thereto. In addition, the sourcing instruction itself may be represented as one or more data chunks that are to be propagated to all boxes.

In operation, the server 402 initiates respective communications with a set of eligible (seeding) boxes 404-1, 404-2, . . . 404-n and provides each of them with the data chunks in a substream that box is supposed to receive. Preferably, at least one of the seeding boxes receives data chunks of a corresponding substream from the server 402. The exact number of the seeding boxes 404-1, 404-2, . . . 404-n initially to receive the data chunks does not constrain the distribution of the substreams. In one embodiment, the designation of the boxes 404-1, 404-2, . . . 404-n is also fairly random. In another embodiment, the designation of the boxes 404-1, 404-2, . . . 404-n is based on corresponding internet service providers (ISP) or geographic locations.

Each of the seeding boxes 404-1, 404-2, . . . 404-n is configured to spread data chunks to other eligible boxes based on the gossip protocol. It should be noted that not all of the boxes 404-1, 404-2, . . . and 404-n have received identical data chunks. Any of the boxes 404-1, 404-2, . . . and 404-n may start to spread a data chunk to other boxes as soon as it has received the data chunk in its entirety. In operation, the box 404-1 is assigned to propagate at least some of its received data chunks to boxes 406-1, 406-2 and 406-3, communicating with one or more of these boxes simultaneously. The box 404-2 is assigned to propagate at least some of its received data chunks to boxes 406-2 and 406-3. The box 406-2 is configured per the instruction to know exactly what data chunks to get from the box 404-1, the box 404-2, and any other boxes configured to feed it chunks of data. Further, the box 406-2 is assigned to propagate at least some of its received data chunks to boxes 408-1, 408-2 and 408-3. Note that the propagation of data is not necessarily hierarchical. For example, box 408-1 might send data chunks "backward" to 406-1, as seen in FIG. 4A.

In one embodiment, the data chunks are propagated only to boxes that actually desire those particular chunks in order to avoid wasteful data transmission. Moreover, wasteful data transmissions may be avoided by ensuring that a data chunk is propagated to a box only if it does not already possess that chunk and is not in the process of downloading that chunk from elsewhere. In one embodiment, if any one of the boxes, for whatever reason, fails to accept data chunks, the box could be dropped as a supplier or a substitute box could be configured to receive and spread the data chunk. By repeatedly and recursively propagating data chunks via boxes after boxes (i.e., by pulling or pushing), eventually all eligible boxes will be colonized to receive the substreams as they are streamed in.

Regardless what scheme is used to colonize the eligible boxes to receive the substreams, a map 409 identifying which box is receiving substream is established and maintained in a server. By the map 409, whenever an order is received from an ordering box, the server can designate appropriate supplying boxes to supply the ongoing substreams to the ordering box. Alternatively, the map 409 enables an ordering box to obtain source information to fetch the substreams to fulfill an order.

In a case in which one of the supplying boxes could no longer supply a substream at a required speed, a substitute supplying box may be immediately called upon to continue supplying the substream. For example, an eligible box has been designated to supply a substream to a box (either an ordering box or another eligible idle box). This eligible box somehow becomes fully used (e.g., engaged to play back a movie), its bandwidths are no longer sufficient to support the deliver of the live program. One or more eligible boxes are determined to substitute this box to continue the original assigned substream.

Figure 5A:
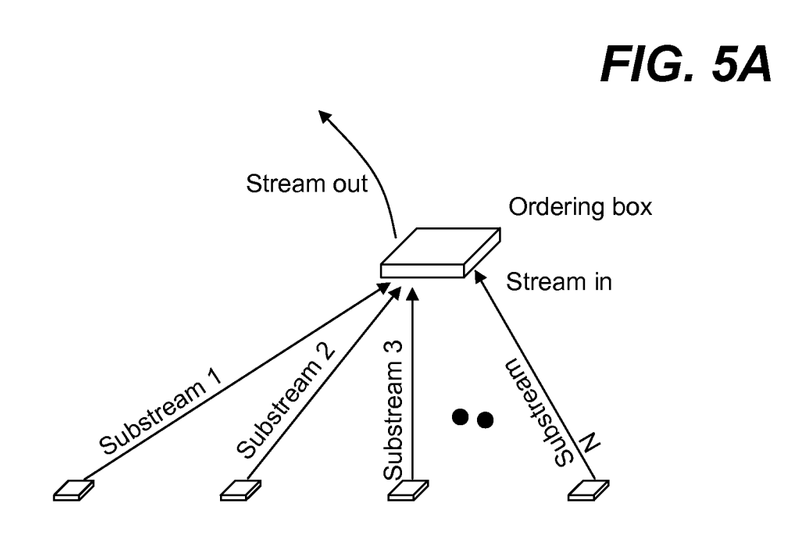
FIG. 5A shows an ordering box being services by peer boxes receiving the substreams.

FIG. 5A shows that an ordering box is receiving N substreams from other peer boxes to fulfill an order of a live program. At the same time, the ordering box may become a data supplier to supply one or more substreams to another peer box, provided the uploading bandwidth thereof is sufficient. In general, the uploading bandwidth requirement for an ordering box to become a supplier is low, compared to an idle box. In one embodiment, as long as an ordering box can upload one substream to another peer box, the ordering box may be designated to become a candidate supplier.

Figure 5B:
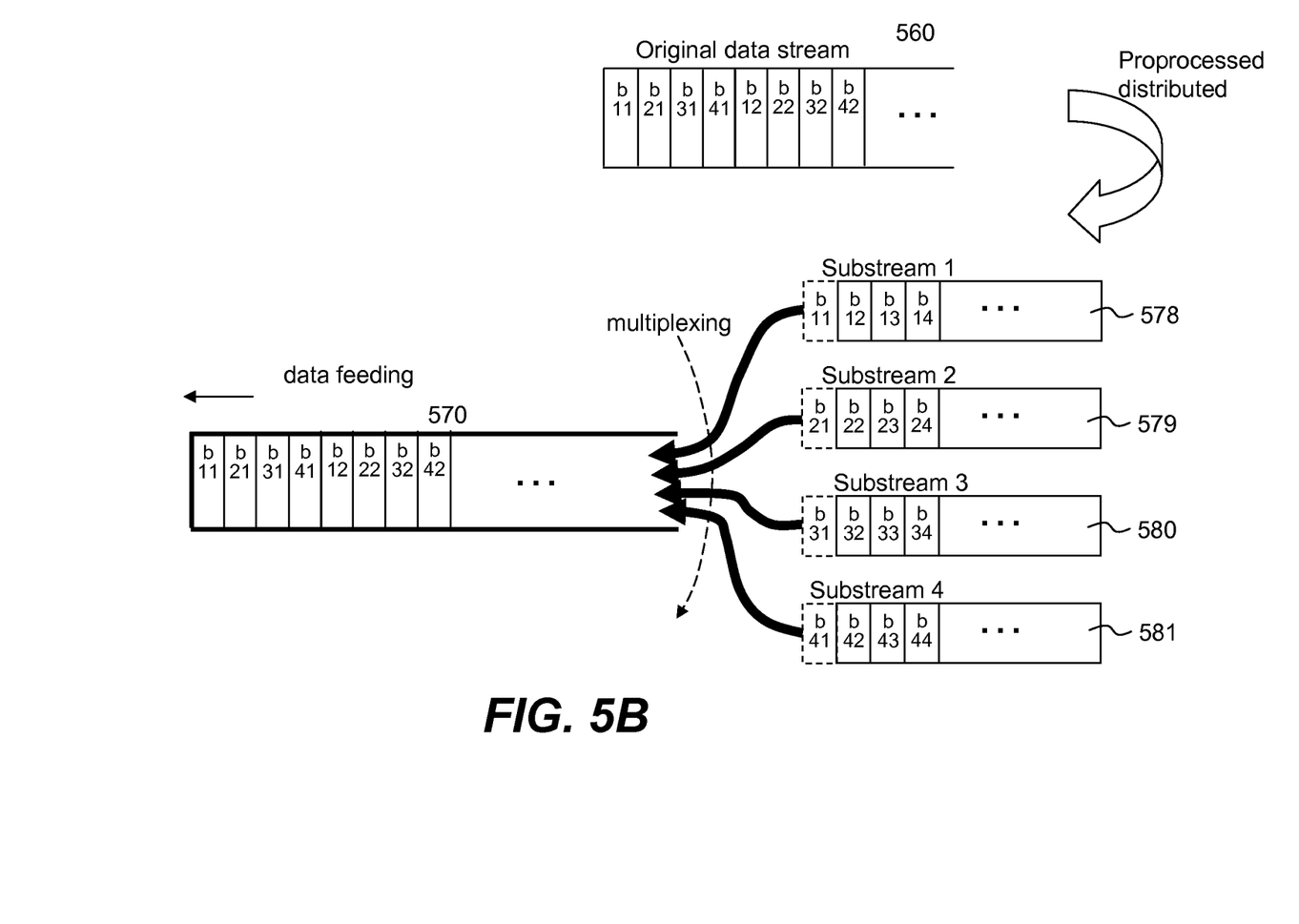
FIG. 5B shows a multiplexing process of four substreams to recover a data stream for playback according to one embodiment of the present invention.

As described above, the data blocks in each of the substreams are not sequential and can not be played back without being blended with that of all the substreams. In one embodiment, all the substreams are streamed in nearly simultaneously so that data blocks in all the substreams can be multiplexed to recover the original data stream for playback. FIG. 5B shows a buffer 570 in a box to receive a live program. It is assumed that the live program is originally represented by a data stream 560. After being preprocessed, the data stream 560 is being partitioned into four substreams that are being released into a distributed network. These four substreams 578-581 are now being streamed in from four peer boxes. As shown in FIG. 5B, as the substreams 578-581 are being received, they are multiplexed into the buffer 570. More specifically, a block of data from the substream 578, a block of data from the substream 579, a block of data from the substream 580 and a block of data from the substream 582 are multiplexed and successively fed into the buffer 570. As a result, the original order of the data blocks is restored. The live program can be played.

One skilled in the art will recognize that elements of a system contemplated in the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, or optical data-storage devices. The computer-readable media can also be distributed over network-coupled computer systems so that the computer-readable code is stored and executed in a distributed fashion.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A method for distributing a live program over a distributed network, the method being performed by a server and comprising:

processing a data stream representing the live program into a plurality of substreams, a number of substreams being based, at least in part, on an availability of bandwidth across devices in the network, each of the substreams comprising decimated samples of the data stream, wherein the processing of the data stream is continuously performed until the live program ends;
identifying a plurality of devices in the network that are idle;
selecting a set of seeding devices from the plurality of devices to receive at least one substream of the plurality of substreams;
transmitting the plurality of substreams to the set of seeding devices with a sourcing instruction, wherein the sourcing instruction instructs the set of seeding devices to transmit specific substreams of the plurality of substreams to specific devices of others of the plurality of devices as the plurality of substreams are received, the seeding devices further transmitting the sourcing instruction to the others of the plurality of devices, the sourcing instruction instructing the others of the plurality of devices to transmit one or more substreams of the plurality of substreams to still other devices of the plurality of devices; and
configuring a plurality of suppliers from the plurality of devices to provide the plurality of substreams to one or more ordering devices in response to the one or more ordering devices requesting to the server to view or listen to the live program so that the live program can be played back on the one or more ordering devices.

2. The method as recited in claim 1, wherein the plurality of substreams comprises N substreams, N being a finite integer, and wherein configuring the plurality of suppliers further comprises designating N suppliers of the plurality of suppliers to each supply a corresponding one of the N substreams to the one or more ordering devices.

3. The method as recited in claim 2, wherein the N substreams are received by the one or more ordering devices concurrently, and wherein data blocks in each of the N substreams are multiplexed by the one or more ordering devices to recover the data stream for viewing or listening to.

4. The method as recited in claim 3, further comprising causing one of the one or more ordering devices to supply one or more of the N substreams to another ordering device.

5. The method as recited in claim 2, further comprising designating another supplier to continue supplying a corresponding one of the plurality of substreams should one of the N suppliers fail to maintain a required transmission speed.

6. The method as recited in claim 2, wherein each of the N suppliers provides one of the substreams to two or more ordering devices.

7. The method as recited in claim 1, wherein processing the data stream comprises:
determining how many substreams are needed to service the live program; and
generating the substreams by continuously sampling the data stream, in a decimated fashion, to generate a plurality of data blocks, wherein the data blocks in the data stream are consecutive while the data blocks in each of the substreams are interleaved.

8. The method as recited in claim 7, wherein identifying the plurality of devices in the network that are idle comprises:
determining a status of all devices in the network and classifying, as the plurality of devices, those devices that have sufficient unused computation power and bandwidths; and
detecting whether each of the plurality of devices has sufficient downloading bandwidth to receive at least one of the plurality of substreams and an uploading bandwidth to provide at least one of the plurality of substreams to more than two ordering devices.

9. The method as recited in claim 8, wherein the plurality of substreams comprises N substreams, and wherein selecting the set of seeding devices from the plurality of devices comprises selecting N seeding devices of the set of seeding devices to each receive one of the N substreams directly from a server configured to provide the N substreams.

10. A system for distributing a live program over a distributed network, the system comprising:
a server configured to generate N substreams that are created from a data stream representing the live program, N being a finite integer and each of the N substreams including decimated samples of the live program, wherein generates number of the N substreams are based, at least in part, on an availability of bandwidth across devices in the network;
a plurality of devices in the network that are idle, wherein a set of seeding devices from among the plurality of devices (i) is selected to receive at least one substream of the N substreams from the server, and (ii) propagate the N substreams to others of the plurality of devices as the N substreams are received from the server, the server further configured to transmit a sourcing instruction to the set of seeding devices, the sourcing instruction instructing the set of seeding devices to transmit the sourcing instruction and specific substreams of the plurality of substreams to specific other devises of the plurality of devices, the sourcing instruction further instructing the other devices of the plurality of devices to transmit one or more substreams of the plurality of substreams to still other devices of the plurality of devices; and
a plurality of ordering devices to request to the server to view or listen to the live program, each of the plurality of ordering devices receiving the N substreams from N of the plurality of devices, wherein each of the N devices is capable of providing a corresponding substream to one or more of the plurality of ordering devices.

11. The system as recited in claim 10, wherein each of the one or more of the plurality of ordering devices receives the N substreams concurrently, and wherein data blocks in each of the N substreams are multiplexed to recover the data stream for viewing or listening to.

12. The system as recited in claim 11, wherein the each of the plurality of ordering devices is configurable to supply one or more of the N substreams to another ordering device.

13. The system as recited in claim 11, wherein each of the plurality of devices has sufficient downloading bandwidth to receive one of the N substreams and an uploading bandwidth to provide a corresponding one of the N substreams to more than two ordering devices.

14. The system as recited in claim 11, wherein each of the plurality of devices has a sufficient downloading bandwidth to receive one of the N substreams and an uploading bandwidth to support multiple streams of one of the N substreams.

15. The system as recited in claim 10, wherein the N substreams are continuously generated by sampling data blocks in a decimated fashion from the data stream being received, wherein the data blocks in the data stream are consecutive while the data blocks in each of the substreams are interleaved.

16. The system as recited in claim 15, wherein each of the plurality of ordering devices receives the N substreams concurrently, and wherein data blocks in the N substreams are multiplexed to recover the data stream for viewing or listening to.

17. The system as recited in claim 15, wherein the set of seeding devices is configured to propagate the N substreams to others of the plurality of devices with a minimum delay in time.

18. A method for distributing media content over a network, the method being performed by a server and comprising:

processing a data stream into a plurality of substreams, a number of substreams being based, at least in part, on an availability of bandwidth across devices in the network, wherein the data stream corresponds to a presentation that includes a live event, wherein the processing of the data stream is continuously performed until the live event ends;

transmitting the substreams with a sourcing instruction to a set of seeding devices in a plurality of devices in the network, wherein the sourcing instruction instructs the set of seeding devices to transmit specific substreams of the plurality of substreams to specific devices of others of the plurality of devices as the plurality of substreams are being received, the seeding devices further transmitting the sourcing instruction to others of the plurality of devices, the sourcing instruction instructing the others of the plurality of devices to transmit one or more substreams of the plurality of substreams to still other devices of the plurality of devices;

configuring a plurality of suppliers from the plurality of devices to transmit the plurality of substreams to a requesting device in response to the requesting device requesting to the server to view or listen to the presentation that includes the live event; and dynamically varying one or more of the plurality of suppliers to transmit the plurality of substreams to the requesting device based on an availability of one or more of the plurality of suppliers.

* * * * *